(12) United States Patent
Festejo

(10) Patent No.: US 12,277,736 B2
(45) Date of Patent: Apr. 15, 2025

(54) SKIN COLOR ASSESSMENT AND COLOR PIGMENT MIXING RECOMMENDATION FOR COSMETIC APPLICATIONS

(71) Applicant: Bianca Jasa Festejo, Los Angeles, CA (US)

(72) Inventor: Bianca Jasa Festejo, Los Angeles, CA (US)

( * ) Notice: Subject to any disclaimer, the term of this patent is extended or adjusted under 35 U.S.C. 154(b) by 0 days.

(21) Appl. No.: 18/896,570

(22) Filed: Sep. 25, 2024

(65) Prior Publication Data

US 2025/0014225 A1     Jan. 9, 2025

Related U.S. Application Data

(63) Continuation of application No. 18/209,970, filed on Jun. 14, 2023.

(60) Provisional application No. 63/352,173, filed on Jun. 14, 2022.

(51) Int. Cl.
*G06K 9/00*     (2022.01)
*G06T 7/90*     (2017.01)

(52) U.S. Cl.
CPC ...... *G06T 7/90* (2017.01); *G06T 2207/20084* (2013.01)

(58) Field of Classification Search
CPC ...... G06T 11/001; G06T 7/90; G06T 2207/20084; G06Q 30/0621; G06Q 30/0631; A45D 33/02; A45D 44/005; A45D 2044/007; A61K 8/18; A61K 2800/42; A61Q 1/02; A61B 5/441
See application file for complete search history.

(56) References Cited

U.S. PATENT DOCUMENTS

| | | | |
|---|---|---|---|
| 2007/0076013 A1* | 4/2007 | Campbell | G06F 18/24 345/589 |
| 2008/0311061 A1* | 12/2008 | Heuer | B01F 33/84 366/142 |
| 2019/0366285 A1* | 12/2019 | Brandon | A45D 44/005 |
| 2021/0236390 A1* | 8/2021 | Charraud | A45D 34/04 |
| 2023/0401749 A1* | 12/2023 | Festejo | G06Q 30/0621 |

* cited by examiner

*Primary Examiner* — Duy M Dang
(74) *Attorney, Agent, or Firm* — Cognition IP, P.C.; Edward Steakley

(57) ABSTRACT

Methods, systems, and apparatus, including computer programs encoded on computer storage media for determining a color pigment mixing recommendation based on a sensor reading of a person's skin. One or more color value sets of a person's skin are determined. The one or more color value sets are evaluated. A color pigment mixing recommendation is generated. The color pigment mixing recommendation including one or more color pigments and an amount of the color pigments to be mixed. The color pigment mixing recommendation is displayed, via a user interface of a client device, the color pigment mixing recommendation.

21 Claims, 11 Drawing Sheets

SKIN COLOR ASSESSMENT AND COLOR PIGMENT MIXING RECOMMENDATION FOR COSMETIC APPLICATIONS

CROSS-REFERENCE TO RELATED APPLICATIONS

This application is a continuation of U.S. patent application Ser. No. 18/209,970, filed on Jun. 14, 2023, which claims the benefit of U.S. Provisional Application No. 63/352,173, filed Jun. 14, 2022, which are hereby incorporated by reference it their entirety.

FIELD

This application relates to the field of cosmetic tattooing, and more particularly to skin color assessment and color pigment mixing recommendation for cosmetic applications.

BACKGROUND

Embodiments of the invention described in this specification relate generally to color matching systems, and more particularly, to a color meter skin tone identification system and process for scanning and identifying skin tone that enables a user, such as camouflage artists, tattoo artists, makeup artists, or others who intend to conceal tattoos, stretch marks, scars, hypopigmentation, hyperpigmentation, vitiligo, and any other form of skin discoloration, to determine skin tone color pigments to use in camouflaging skin.

Many people have scars, stretch marks, tattoos, hypopigmentation, hyperpigmentation, vitiligo, other forms of skin discoloration, and other markings or blemishes of their skin which they wish to conceal. Camouflage and scar tattoo artists often cannot identify the correct colors of skin tone to match with their ink color pigments.

Therefore, what is needed is a way to identify skin tone colors and pigments to accurately provide a way to conceal skin markings and blemishes.

SUMMARY

It is an advantage of the present disclosure to provide improved systems and methods for skin color assessment and color pigment mixing recommendation for cosmetic applications. The disclosed features, components, systems and methods provide improved consistency and color matching for the application of color pigments for cosmetic tattooing.

Methods, systems, and apparatus, including computer programs encoded on computer storage media for determining a color pigment mixing recommendation based on a sensor reading of a person's skin. One or more color value sets of a person's skin are determined. The one or more color value sets are evaluated. A color pigment mixing recommendation is generated. The color pigment mixing recommendation including one or more color pigments and an amount of the color pigments to be mixed. The color pigment mixing recommendation is displayed, via a user interface of a client device, the color pigment mixing recommendation.

Some embodiments of the invention include a novel color meter skin tone identification system and process for scanning and identifying skin tone are disclosed which enables a user to determine skin tone color pigments to use in camouflaging skin. In some embodiments, the color meter skin tone identification process is implemented as software. The software is readily available for most users as a mobile application with additional mobile app tools for a user to get the right color pigments to use in order to camouflage their (or other person's) skin (e.g., camouflage tattoos, stretch marks, scars, hypopigmentation, hyperpigmentation, vitiligo, or any other form of skin discoloration). In this way, the color meter skin tone identification system provides the right color pigments to use in order to camouflage the skin. This is used for camouflage tattoo artists, scars and stretch marks, hypopigmentation, hyperpigmentation, vitiligo, and any other form of skin discoloration.

In some embodiments, the color meter skin tone identification system comprises a color reader device, a software application that runs on a separate device (e.g., a smartphone, tablet computing device, etc.), a wireless data connection between the color reader device and the device on which the software application runs to link them together for data communication, and a user interface in the software application that provides interactive step-by-step user inputs and provides an instant solution and determination of pigments to use. In some embodiments, the color meter skin tone identification system is deployed as a local-only system in which there is a direct peer-to-peer connection between the color reader device and the device on which the software application runs. In some embodiments, the color meter skin tone identification system is deployed as a cloud application service to which the software application connects for processing when the device on which the software application runs is linked wirelessly to the color reader device (e.g., paired via Bluetooth).

In some embodiments, the color meter skin tone identification process for scanning and identifying skin tone comprises (i) switching on a color reader device configured to analyze skin and determine skin pigment and tone, (ii) pairing the color reader device via Bluetooth to a device running a software application configured to work together with the color reader device to provide a matching skin tone color and recommendations of different proprietary color pigments, (iii) performing an initial color calibration via the software application, wherein the initial color calibration calibrates black and white colors as a baseline color calibration, (iv) placing the color reader device on an area of skin by a user, (v) automatically detecting, by the software application, that the color reader device is placed on skin, (vi) analyzing, by the software application, the pigments and skin tone of the skin on which the color reader device is placed, (vii) providing, by the software application, a resulting matching skin tone color determination, and (viii) providing, by the software application, recommendations to the user with different proprietary color pigments.

In some embodiments, the color reader device is a particular color reader device configured to attach directly to the device running the software application. In some embodiments, the particular color reader device comprises a lens that attaches to the device approximately at a position of an onboard camera of the device running the software application. In some embodiments, the particular color reader device comprises an external camera that attaches to the device running the software application.

The appended claims further serves as a summary of this application.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
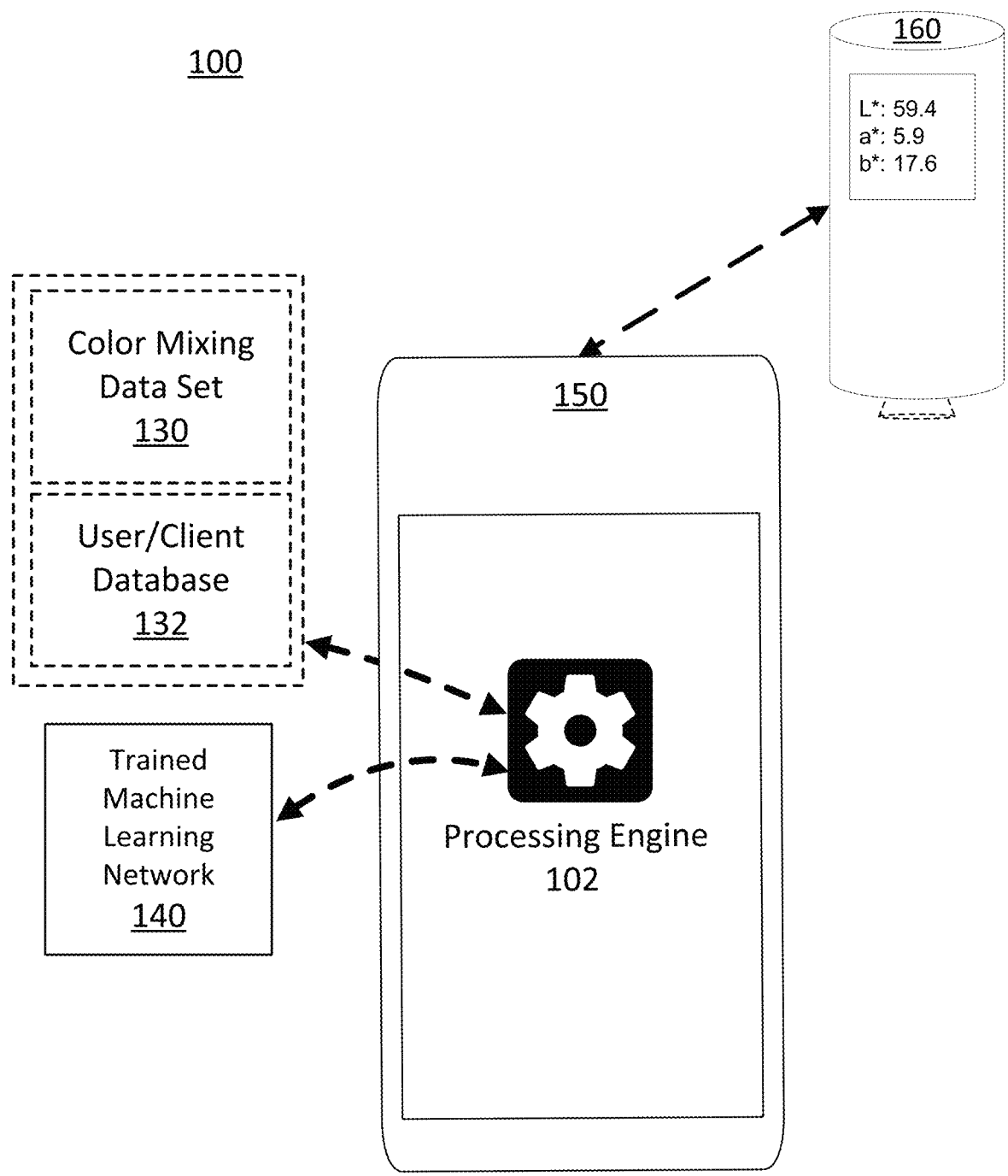
FIG. 1 is a diagram illustrating an exemplary environment in which some embodiments may operate.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments of the invention include a novel color meter skin tone identification system and process for scanning and identifying skin tone are disclosed which enables a user to determine skin tone color pigments to use in camouflaging skin. In some embodiments, the color meter skin tone identification process is implemented as software. The software is readily available for most users as a mobile application with additional mobile app tools for a user to get the right color pigments to use in order to camouflage their (or other person's) skin (e.g., camouflage tattoos, stretch marks, scars, hypopigmentation, hyperpigmentation, vitiligo, or any other form of skin discoloration). In this way, the color meter skin tone identification system provides the right color pigments to use in order to camouflage the skin. This is used for camouflage tattoo artists, scars and stretch marks, hypopigmentation, hyperpigmentation, vitiligo, and any other form of skin discoloration.

As stated above, many people have scars, stretch marks, tattoos, hypopigmentation, hyperpigmentation, vitiligo, other forms of skin discoloration, and/or other markings or blemishes of their skin which they wish to conceal. Camouflage and scar tattoo artists often cannot identify the correct colors of skin tone to match with their ink color pigments. Embodiments of the color meter skin tone identification system and process for scanning and identifying skin tone described in this specification solve such problems by providing a way for tattoo artists to determine the correct color to match. The color meter skin tone identification system and process for scanning and identifying skin tone performs this function by way of a software application—specifically, a mobile app—which connects to a skin tone pigment reader device via a wireless communication mechanism, such as Bluetooth. The connection of the skin tone pigment reader device to the software implementation (mobile app implementation) of the color meter skin tone identification process for scanning and identifying skin tone defines the color meter skin tone identification system. Additionally, the color meter skin tone identification system of some embodiments is deployed as a cloud application service and the color meter skin tone identification process for scanning and identifying skin tone is implemented as a web application that runs on a computing device connected to the cloud application service.

Embodiments of the color meter skin tone identification system and process for scanning and identifying skin tone described in this specification differ from and improve upon currently existing options. In particular, camouflage tattoo artists currently must use manually different pigments. This current mechanism often results in failures and loss of time. By contrast, the color meter skin tone identification system and process for scanning and identifying skin tone described in this specification provides an instant solution for matching skin tone pigments to dies and inks, and is implemented/deployed on universal platform, that is, mobile device via mobile app.

The color meter skin tone identification system of the present disclosure may be comprised of the following elements. This list of possible constituent elements is intended to be exemplary only and it is not intended that this list be used to limit the color meter skin tone identification system of the present application to just these elements. Persons having ordinary skill in the art relevant to the present disclosure may understand there to be equivalent elements that may be substituted within the present disclosure without changing the essential function or operation of the color meter skin tone identification system.

1. Color reader device.
2. Software application (e.g., mobile app, web app, etc.).
3. Wireless connection between the color reader device and the device on which the software application runs to link them together for data communication in the system (the wireless data connection exists regardless of whether the color reader device and the software application are connected locally only or in a direct peer-to-peer relationship, or a wider, cloud-based connection to a cloud application service).
4. The software application provides an instant solution with the accurately determined pigments to use.

The various elements of the color meter skin tone identification system of the present disclosure may be related in a manner to carry out steps of the color meter skin tone identification process for scanning and identifying skin tone. The steps of the color meter skin tone identification process for scanning and identifying skin tone are not intended to limit the scope or nature of the relationships between the various elements of the color meter skin tone identification system and the following examples are presented as illustrative examples only.

1. Switch on (power up) the color reader device.
2. Pair the color reader device via Bluetooth to the device on which the software application is running.
3. Start initial calibration via the software application. This involves calibrating black and white colors as a baseline color calibration.
4. When the correct calibration is achieved, a user can place the color reader device on an area of skin.
5. The software application automatically detects this placement on the skin and analyzes the pigments and skin tone.
6. The software application then provides a resulting matching skin tone color.
7. The software application may also provide recommendations to the user with different proprietary color pigments.

The color meter skin tone identification system and process for scanning and identifying skin tone of the present disclosure generally works by communicably connecting the color reader device and the software application (or the device on which the software runs) via Bluetooth. Then an initial color calibration is performed to provide a common color space that is understood as a baseline for the color reader device and the software application. Color pigment recommendations are proprietary and provided as recommendations to some users who use the software application to determine skin tone color. Since the software application and the pigments are separate, the color reader device is connected to the software application so that the software application can give the user information for the right ink pigments to use.

To make the color meter skin tone identification system and process for scanning and identifying skin tone of the present disclosure, a person may first create (manufacture) or find (off-the-shelf) a color reader device that is preferably in a small form factor and supports a wireless data communication protocol, preferably Bluetooth. The person would need to design and develop (code and build) the software application, preferably a mobile app implementation, but may also be suitable as a web app or separate desktop-style software program. When completed, the color reader device would be linked to the software application (e.g., paired via Bluetooth). Recommendations of other proprietary color pigments may be possible with permission of owners, however, this is an optional step if the user merely wishes to detect and determine the actual skin tone color when the color reader device is placed on skin (e.g., to detect and determine skin tone to provide the right pigments to cover and blend the tattoos, stretch marks, scars, hypopigmentation, hyperpigmentation, vitiligo, other forms of skin discoloration, or other blemishes with the tone/color pigment of the original skin).

FIG. 1 is a diagram illustrating an exemplary environment in which some embodiments may operate. In the exemplary system 100, a client device 150 is connected to a processing engine 102. The processing engine 102 is connected to one or more repositories (e.g., non-transitory data storage) and/or databases, including a color mixing data set 130 for training a machine learning network, and a user client/client database 132. One or more of the databases may be combined or split into multiple databases. The first user's client device 150 in this environment may be computers, and the processing engine 102 may be applications or software hosted on a computing device or multiple computing devices which are communicatively coupled via remote server or locally. A color reading device 160 may be optionally connected to the client device 150. In some embodiments, the client device 150 and the processing engine 102 may be part of the same computer or device.

In an embodiment, processing engine 102 may perform the methods 300, 400 or other methods herein and, as a result, provide for determining audio control intention during a video communications session. In some embodiments, the processing engine 102 is an application, browser extension, or other piece of software hosted on the computing device 150 device or is itself a computer or similar device configured to host an application, browser extension, or other piece of software to perform some of the methods and embodiments herein.

The client device 150 may be a device with a display configured to present information to a user of the client device 150. In some embodiments, the client device 150 present information in the form of a user interface (UI) with UI elements or components. In some embodiments, the client device 150 and additional users' client device(s) 151 send and receive signals and/or information to the processing engine 102. The client device 150 may be configured to perform functions related to the obtaining of color values for a person's skin, process the color values of the person's skin to determine a color pigment mixing recommendation, and store and manage the determined color pigment mixing recommendation with respect to a particular person or user.

In some embodiments, the client device 150 is a computing device capable of hosting and executing one or more applications or other programs capable of sending and/or receiving information. In some embodiments, the client device 150 may be a tablet device, a computer desktop or laptop, a mobile phone or any other suitable computing device capable of sending and receiving information. In some embodiments, the processing engine 102 may be hosted in whole or in part as an application or web service executed on the client device 150.

In some embodiments, optional repositories can include one or more of: a color mixing data set 130 and user/client database 132. In some embodiments, a machine learning network 140 may be trained to determine or classify a color pigment mixing recommendation based on the evaluation one or more color value sets readings of a person's skin where the one or more obtained color value readings are input into the trained machine learning network. Trained machine learning networks or models may be distributed to the respective client device 150 allowing the client device 150 to use the trained machine learning network for processing of the obtained color values directly by a respective client device.

Figure 2A:
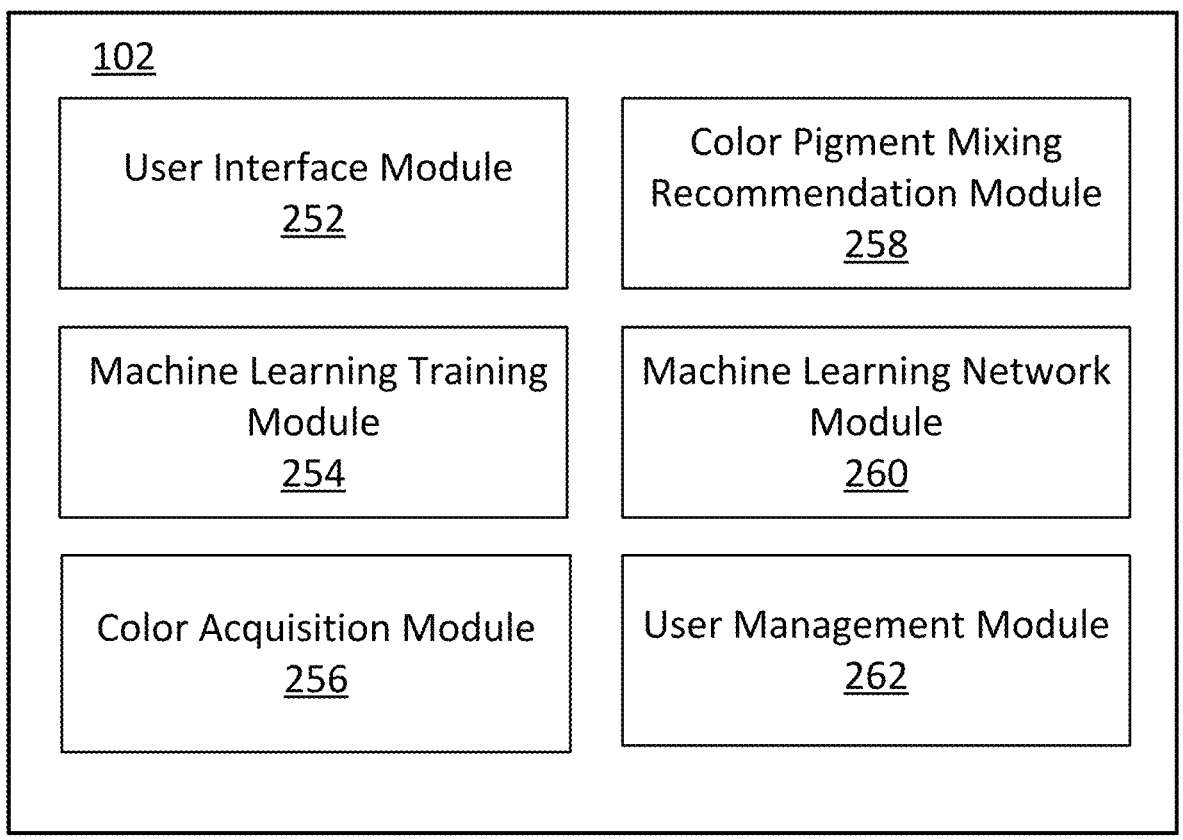
FIG. 2A-2B are diagrams illustrating an exemplary computer system with software and/or hardware modules that may execute some of the functionality described herein.
Figure 2B:
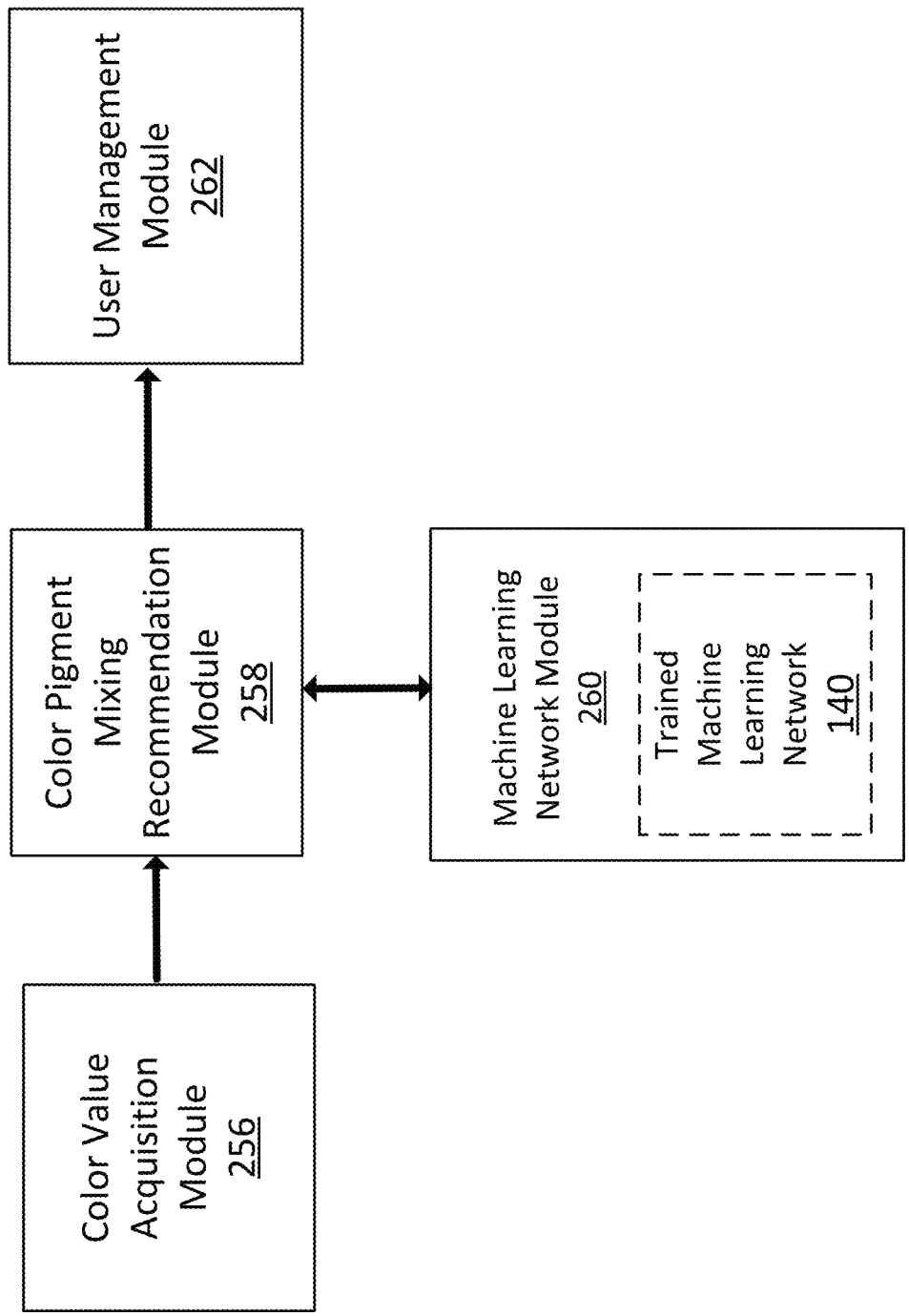

FIGS. 2A-2B are diagrams illustrating an exemplary processing engine 102 with software modules that may execute some of the functionality described herein.

The User Interface Module 252 provides system functionality for presenting a user interface via the client device 150. User inputs received by the user interface herein may include clicks, keyboard inputs, touch inputs, taps, swipes, gestures, voice commands, activation of interface controls, and other user inputs. In some embodiments, the User Interface Module 252 presents a visual user interface on a display screen. In some embodiments, the user interface may comprise display sections for the display of a color pigment mixing recommendation for a particular client or user.

The Machine Learning Training Module 254 provides system functionality for the training of a machine learning network based on color values of a person's skin and two or more colors to be mixed to achieve a match with the color values of a person's skin. The machine learning network 140 may be trained to determine or classify a color pigment mixing recommendation based on one or more readings of color values of a person's skin. The training of the machine learning network for example may be based on supervised learning where multiple color values of different skin colors and tones are obtained. These multiple color values may be associated with a specific recipe and/or ration of particular colors to be missed to achieve the skin color of a person.

In some embodiments, the machine learning network is a neural network, such as a convolution neural network, a recurrent neural network, a modular neural network, etc. Neural networks may be comprised of a plurality of neural network nodes. Neural network nodes may be connected to each other such that the output of one node is the input of another node. Moreover, neural network nodes may be organized into layers, each layer comprising one or more nodes.

Once the machine learning network is trained, then subsequent color values of a person's skin may be obtained by the client device and input into the trained machine learning network. The trained machine learning network 140 may then determine and/or classify a color pigment mixing recommendation based on the input of one or more multiple color values. In some embodiments, the obtained color value readings are obtained from a separate color reading device 160. In some embodiments, the client device 150 may obtain one or more images of a person's skin and determine color value readings. In one embodiment, the color value readings are in the L*a*b*color space and the readings comprise an L*value, and a*value, and a b*value for each of the readings. Other color spaces may be used. For example, the client device 150 may obtain images in the sRGB color space or the generic RGB color space. The machine learning network may be trained also on RGB color values from color value readings of a person's skin. The trained machine learning network 140 may then determine and/or classify a color pigment mixing recommendation based on the input one or more multiple sRGB and/or generic RGB color values.

In some embodiments, the machine learning network 140 is trained on an image data set of images of multiple person's skin color. The machine learning network 140 may be trained via supervised or reinforced learning to match an image with a set of pixels to a particular color pigment mixing recommendation. In other words, the trained machine learning network 140 may receive an image obtained by the client device 150 and the trained machine learning network 140 may determine a color pigment mixing recommendation with an amount and ratio of particular colors that are to be mixed to achieve the color of person's skin.

The Color Acquisition Module 256 provides system functionality for obtaining color values of a person's skin for processing via the Color Pigment Mixing Recommendation Module 258. For example, one or more color value sets of a person's skin may be obtained by a separate color reading device 160 paired or connected with the client device 150 and/or the client device 150 may obtain one or more images of a person's skin and process the images to determine one or more color value sets of a person's skin.

The Color Pigment Mixing Recommendation Module 258 provides system functionality for interaction with the Machine Learning Network Module 260 to determine a color pigment mixing recommendation. The Color Pigment Mixing Recommendation Module 258 may determine based on one or more images of a person's skin and/or one or more color value sets readings of a person's skin, a color pigment mixing recommendation identifying particular color pigments to mix to achieve an approximate color match to the person's skin.

The Machine Learning Network Module 260 provides system functionality for using a trained machine learning network to process obtained images and/or color value readings by the client device 150. The Machine Learning Network Module 260 may use inputs of obtained images and/or obtained color value readings for input and processing by the trained machine learning network for determining a color pigment mixing recommendation. The color pigment mixing recommendation includes two or more colors that are to be mixed in a quantity of the colors to achieve a match of the person's skin.

In some embodiments, the Color Pigment Mixing Recommendation Module 250 determines one or more color pigment recommendations by looking up a color value reading of a person's skin against a table have multiple color value reading entries. The system matches against the closest table entries corresponding to the color value reading.

The User Management Module 262 provides system functionality for associating and managing determined color pigment mixing recommendations for different users or clients.

Figure 3:
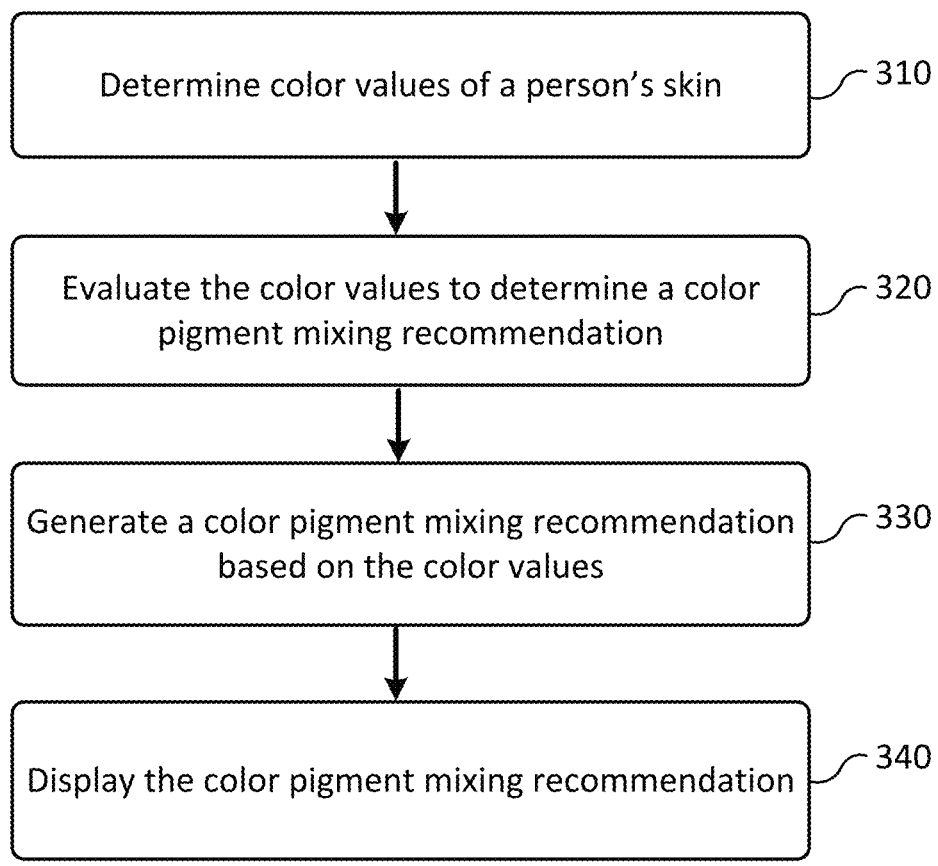
FIG. 3 is a flow chart illustrating an exemplary method that may be performed in some embodiments.

FIG. 3 is a flow chart illustrating an exemplary method 300 that may be performed in some embodiments. The system may determine a color pigment mixing recommendation based on skin color readings of a person.

In step 310 the system 100 determines one or more color value sets of a person's skin. In one embodiment, the color values include a set of color values, such as L*, a*, b*color values and or R, G, B color values. The system provides various modes operation to obtain the color values sets for subsequent evaluation. The color values of a set include at least three color values, a first value, a second value and a third value. For example, in one mode of operation the system displays a user interface where a user may input directly into the user interface the color values. In another mode of operation, the system may obtain color values from a separate color reading device 160. In this mode of operation, a user obtains one or more color value readings from the separate color reading device. The separate color readings are stored by the client device 150. For example, the color reading device may obtain L*, a*, b*color values. The separate color reading device 160 is place over an area where a user would like to obtain a color reading of the person's skin. When the separate color reading device 160 is actuated the color reading device obtains the color reading values and transmits the values to the client device 150. In another mode of operation, the client device may use an onboard camera to obtain one or more images of a person's skin. The images are then processed by the system to determine the color values, such as RGB color values. The system 100 may evaluate the pixels of the image to determine average color values of a group of pixels to generate the color values. In some modes of operation, the images are input into a trained machine learning network to generate the color values. In other modes of operation, the images are input into a trained machine learning network to generate a color pigment mixing recommendation. In some modes of operation, the system 100 makes adjustments to the images based on make and model of the client device obtain the image, such as performing a lighting and/or color balance adjustment.

In step 320, the system 100 evaluates the one or more color value sets. In some modes of operation, the system 100 compares an obtained color value set to a lookup table having multiple entries of color value sets. The system searches to find an exact match or an approximate match for each of the first, second and third color values. For example, the client device 150 may receive a skin color reading from the color reading device 160 as a color value set including an L*value, a*value and b*value, such as L:58.89, A:5.92 and B:17.71. The system searches for a match in the lookup table. In some instances, a value in the lookup table is an exact match to the color value set from the color reading device. In other instances, no exact match exists. In such a case, the system identifies one or more closest or approximate matches to the color value set obtained from the reading device to the values stored in the lookup table. The system may perform a similarity determination and generate a similarity score or ranking for the one or more closest or approximate matches to the color value set. For example, the system may identify four approximate matches with a lookup table record values of L:58.9, A:8.1, B:19.3; L:59.7, A:4.9; B:19.8; L:57.4, A:6.3, B:20.1 and L:56.8, A:5.5, B:18.6. These four matches are determined by the system to be the closest color match to the color value reading of L:58.89, A:5.92 and 5:17.71.

In step 330, the system 100 generates a color pigment mixing recommendation. The color pigment recommendation describes a recipe of mixing together color pigments in a specified amount to achieve a color match to the person's skin color reading. The color pigment mixing recommendations includes one or more color pigments and an amount of the color pigments to be mixed. Each of the entries in the lookup table may have a predefine recipe or color pigment mixing profile associated with the table entry. For example, for the lookup table recommendation L:58.9, A:8.1, A:8.1, a color pigment mixing profile or recipe may describe adding 1 drop of Pigment 4, 1 drop of Pigment 8 and 2 drops of Pigment 12. Also, the profile or recipe may include a description to lighten by adding one more drops of Pigment 4 until obtaining a desired shade. Moreover, the profile or recipe may include a description to darken by adding one or more drops of Pigment 12 until obtaining a desired shade. In another example, for the lookup table recommendation L:59.7, A:4.9 and B:19.8, a color pigment mixing profile or recipe may describe adding 1 drop of Pigment 11 and one drop of Pigment 12. The first recommendation the system may have determined a similarity score of 1.68 "very similar" and for the second recommendation, the system may have determined a similarity score of 1.75 "very similar". What should be noted is that the system may provide different recommendations to use and mix different color pigments in different quantities to achieve a similar color outcome.

In some modes of operation, the skin color reading color obtained from the color reading device 160 may be input into a trained machine learning network 140. The trained machine learning network evaluates the color values to determine a pigment mixing recommendation. The machine learning network may be trained to learn which of a group of color pigments would produce a color match by mixing the color pigments. The output of the trained machine learning network would include a color mixing profile or recipe describing one or more color pigments to mix in a specified quantity.

In step 340, the system 100 displays the generated color pigment mixing recommendation. One or more generated color pigment mixing recommendations are displayed via a display of the client device 150. The initial skin color reading and one or more color pigment mixing recommendations may be displayed via a user interface.

Figure 4:
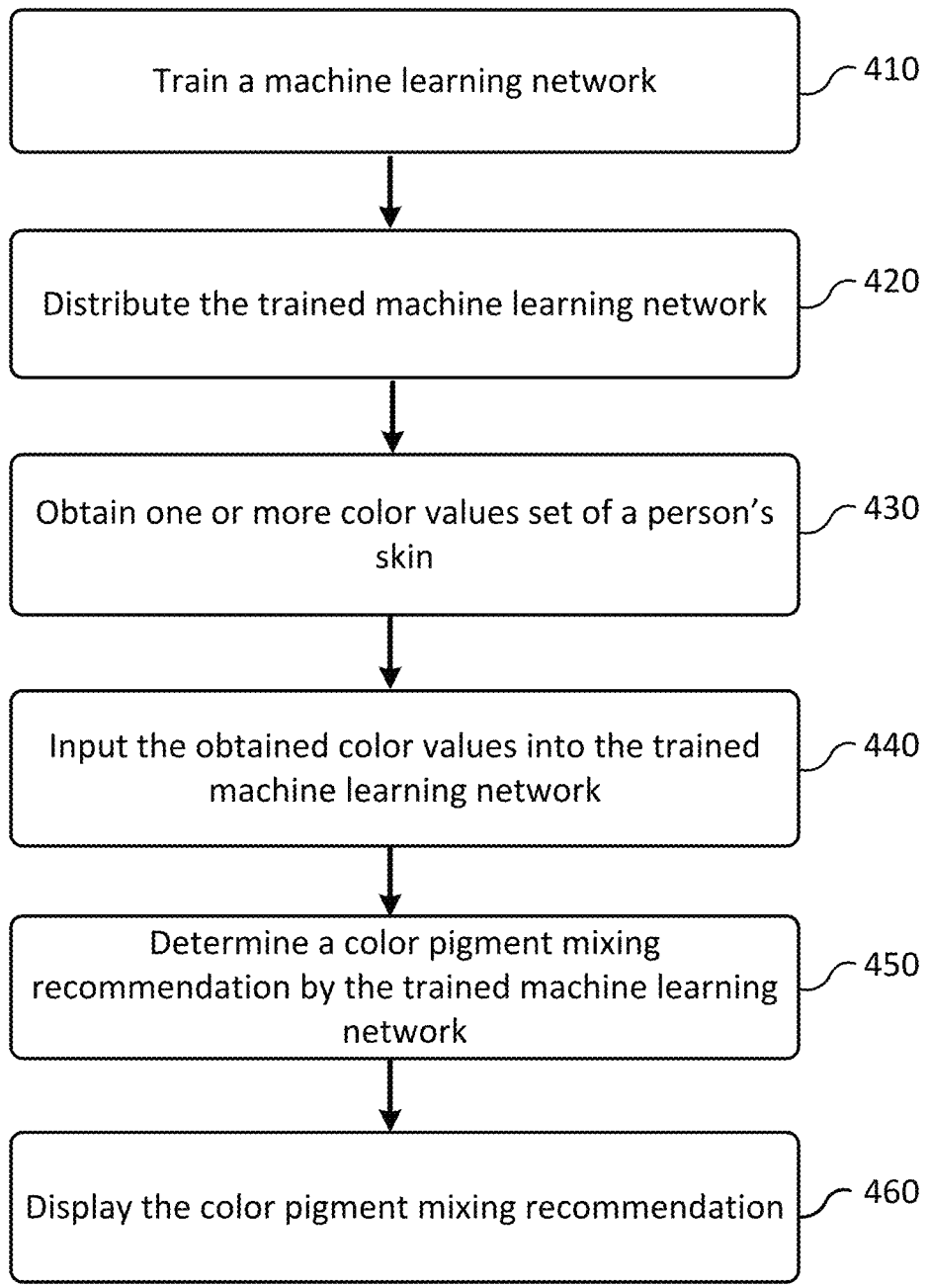
FIG. 4 is a flow chart illustrating an exemplary method that may be performed in some embodiments.

FIG. 4 is a flow chart illustrating an exemplary method 400 that may be performed in some embodiments. The system may train a machine learning model and/or machine learning network. In step 410, a machine learning network or model may be trained using a dataset of multiple images and/or color value readings of a different people. The machine learning network is trained to determine or classify a color pigment mixing recommendation based on a received input. In some embodiments, the machine learning network may be a neural network, convolutional neural network, deep neural network or other suitable types of machine learning networks. In some embodiments, training samples of images may comprise input and output pairs for supervised learning, wherein the input may comprise one or more images of different skin image samples and the output pair being the color pigment mixing recommendation. The color pigment mixing recommendation includes two or more colors (such as color pigments, paints) that are to be mixed together and applied to the person's skin. The color pigment mixing recommendation may include an amount, quantity and/or a ratio of particular colors that are to be mixed together. In other words, the trained machine learning network 140 determines an ingredient and mixing recipe so that when the cosmetic tattoo pigments are mixed together they would closely match the person's skin color.

In step 420, the trained machine learning network 140 may be distributed to one or more client devices, where the client devices may use the trained machine learning network to input an image depicting and/or color readings of a person's skin color.

In step 430, an image or images and/or color readings of a person's skin color is obtained by a client device. For example, the client device may have an interconnected video camera that obtains imagery of a person's skin, and then the client device computes or determines skin color values from the images. Alternatively, the client device 150 may receive color readings (such as L*a*b*values) of a person's skin from a separate color reading device 160.

In step 440, the obtained images and/or color readings of a person's skin may be input in the trained machine learning network 104. The images may be input into the trained machine learning network as a single image or input as series of images.

In step 450, the trained machine learning network 140 may determine a color pigment mixing recommendation based on the input images and/or the color reading values. The trained machine learning network may generate a confidence level value or probability value associated with color pigment mixing recommendation.

In step 460, the system may then display the color pigment mixing recommendation via a user interface of the client device. The color pigment mixing recommendation may be associated with a particular user or client, and stored locally on the client device 150.

Figure 5:
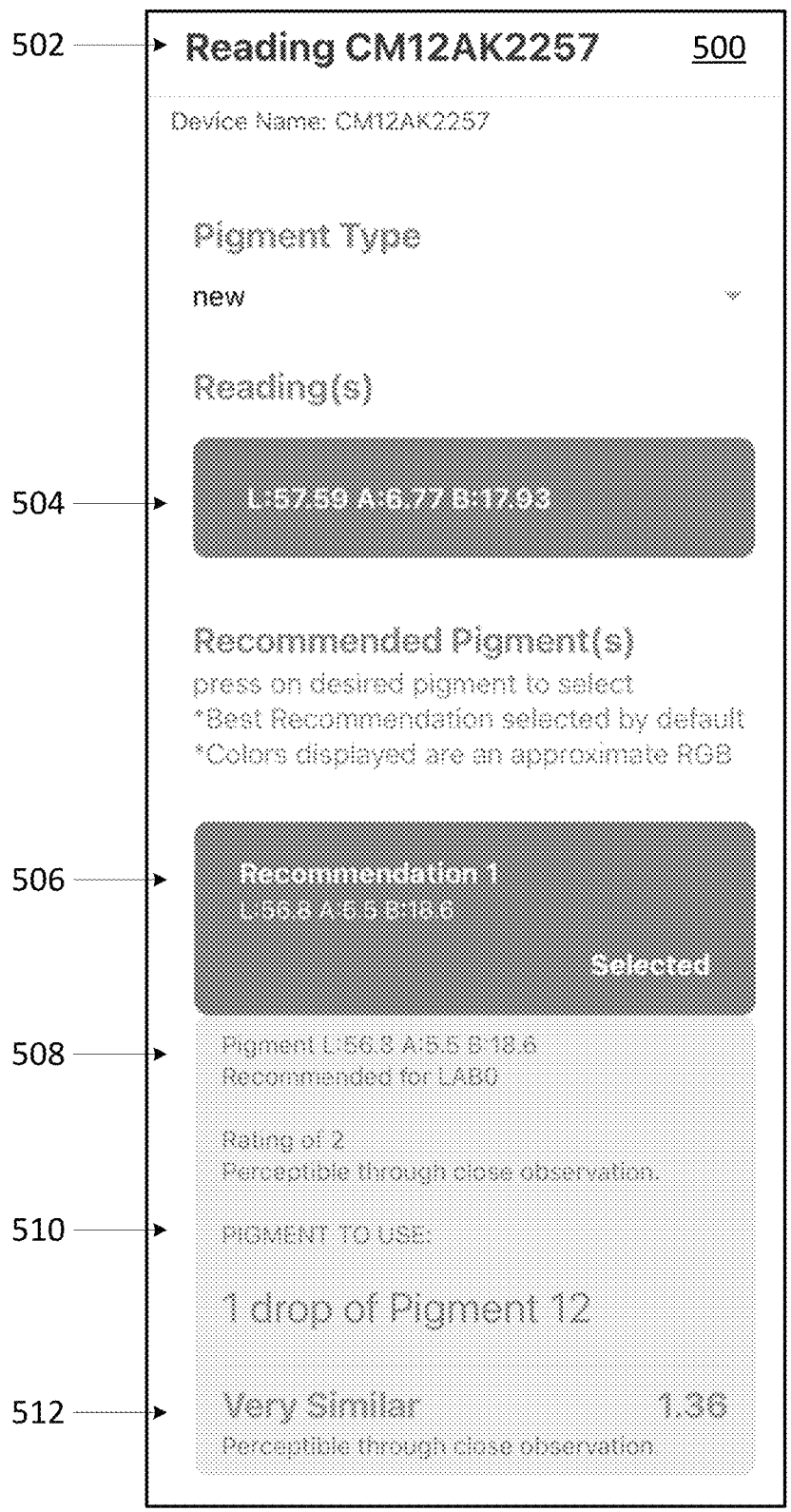
FIG. 5 is diagram of a graphical user interface illustrating functionality performed according to some embodiments.

FIG. 5 is diagram of a graphical user interface 500 illustrating functionality performed according to some embodiments. The client device 150 is configured to display the user interface 500 with the following section: a device identifier section 502 to display an identifier of the color reading device 160 paired with the client device 150 (e.g., CM12AK2257); a color readings section 504 to display a color reading obtained from the color reading device 160 (e.g., L:57.59, A:6.77, B:17.93 in the L*, a*, b*color space); a color recommendation section 506 to display a matched recommendation (e.g., L:56.8, A:5.5, B:18.6) to the color reading obtained from the color reading device, a pigment section 508 to display the matched recommendation (e.g., L:56.8, A:5.5, B:18.6); a color pigment mixing section 510 to describe one or more color pigments and optionally a white pigment a diluent; and a similarity score section 512 describing a similar score for the matched recommendation as to the color reading.

Figure 6:
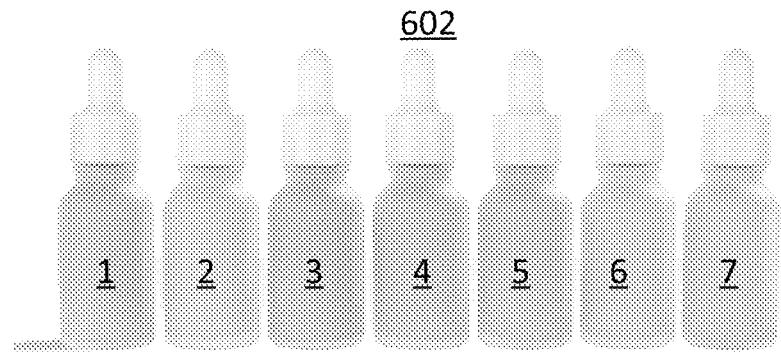
FIG. 6 is diagram of a graphical user interface illustrating functionality performed according to some embodiments.
Figure 6:
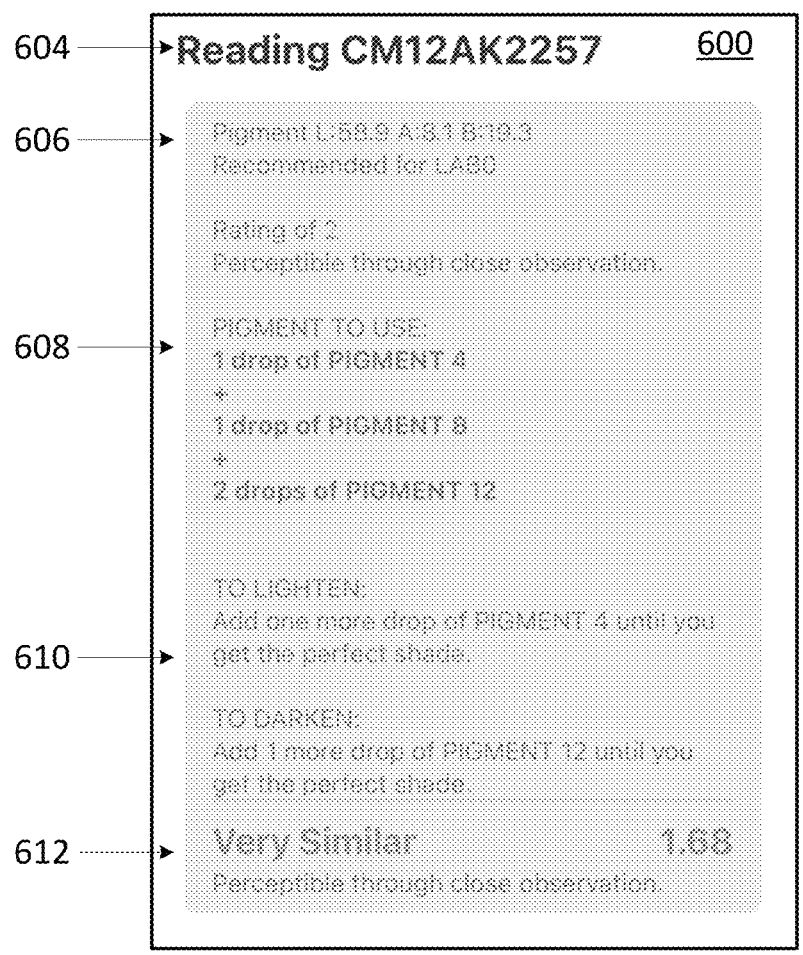

FIG. 6 is diagram of a graphical user interface 600 illustrating functionality performed according to some embodiments. The client device 150 is configured to display the user interface 600 with various sections. The user interface 600 describes an example of a color pigment recommendation to achieve the color of the recommended pigment (e.g., L:58.9, A:8.1, B:19.3). A set of color pigments 602 may be provided as part of a kit with each of the color pigments having an identifier, such as 1, 2, 3, etc. In some embodiments, the kit includes 20 different pigment shades, a white pigment and a diluent. The user interface 600 includes a color pigment mixing section 608 describing a recommended recipe to achieve the color of the recommended pigment (e.g., 1 drop of Pigment 4, 1 drop of Pigment 8 and 2 drops of Pigment 12). Also, the user interface 600 includes a section with instructions to lighten or darken the mixture to obtain different shading (e.g., add one or more drops of Pigment 4 to lighten, and add one or more drops of Pigment 12 to lighten). The identifier associated with a particular bottle of a color pigment corresponds to the Pigment number. In this example, a bottle of Pigment 4, Pigment 8 and Pigment 12 would be used and the quantity of the pigment would be mixed together. The final mixture would be used by a clinician and applied, for example, as cosmetic tattooing over a portion of a client's skin. In this example, a similarity score of 1.68 has been determined by the system and is displayed in the similarity score section 612.

Figure 7A:
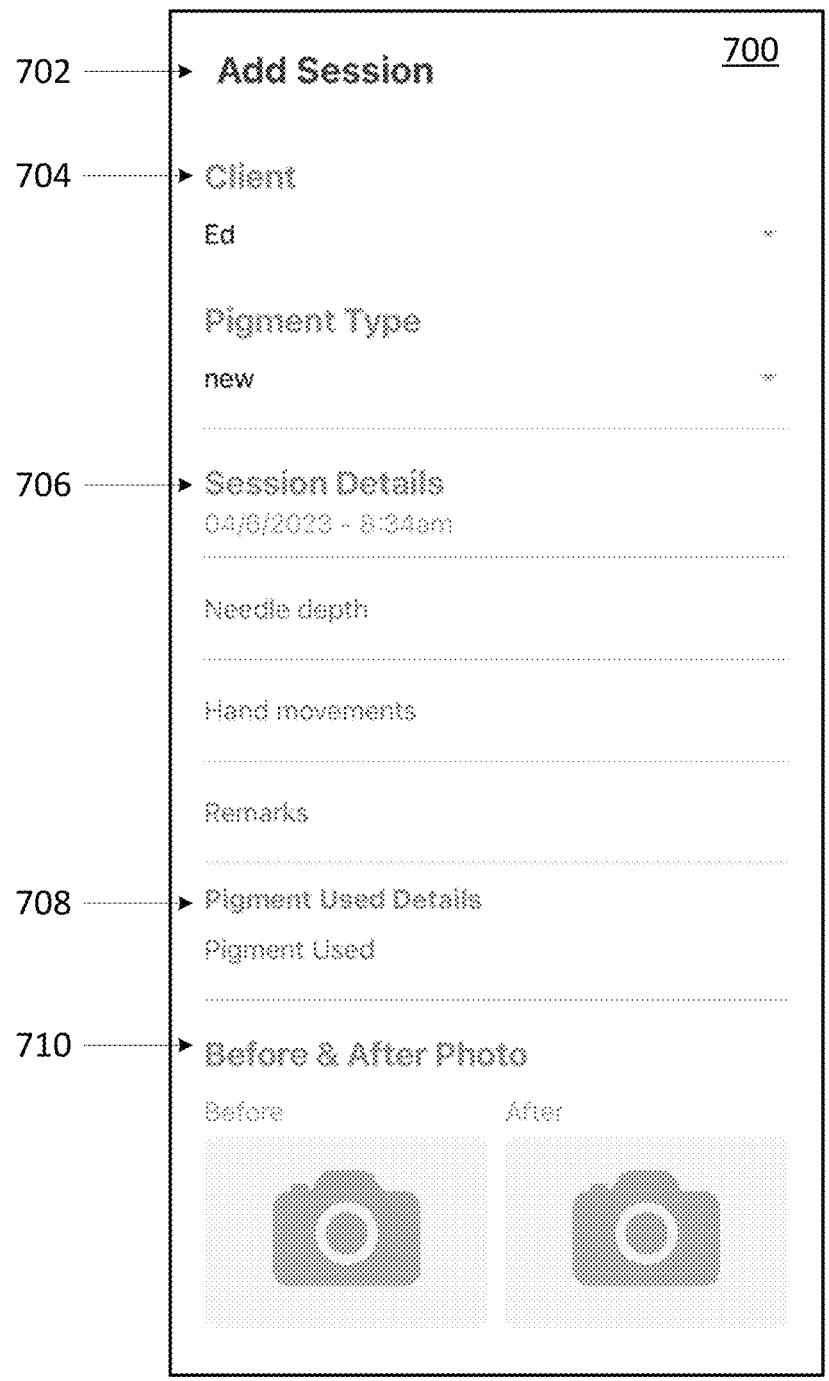
FIGS. 7A-7C are diagrams of a graphical user interface illustrating functionality performed according to some embodiments.
Figure 7B:
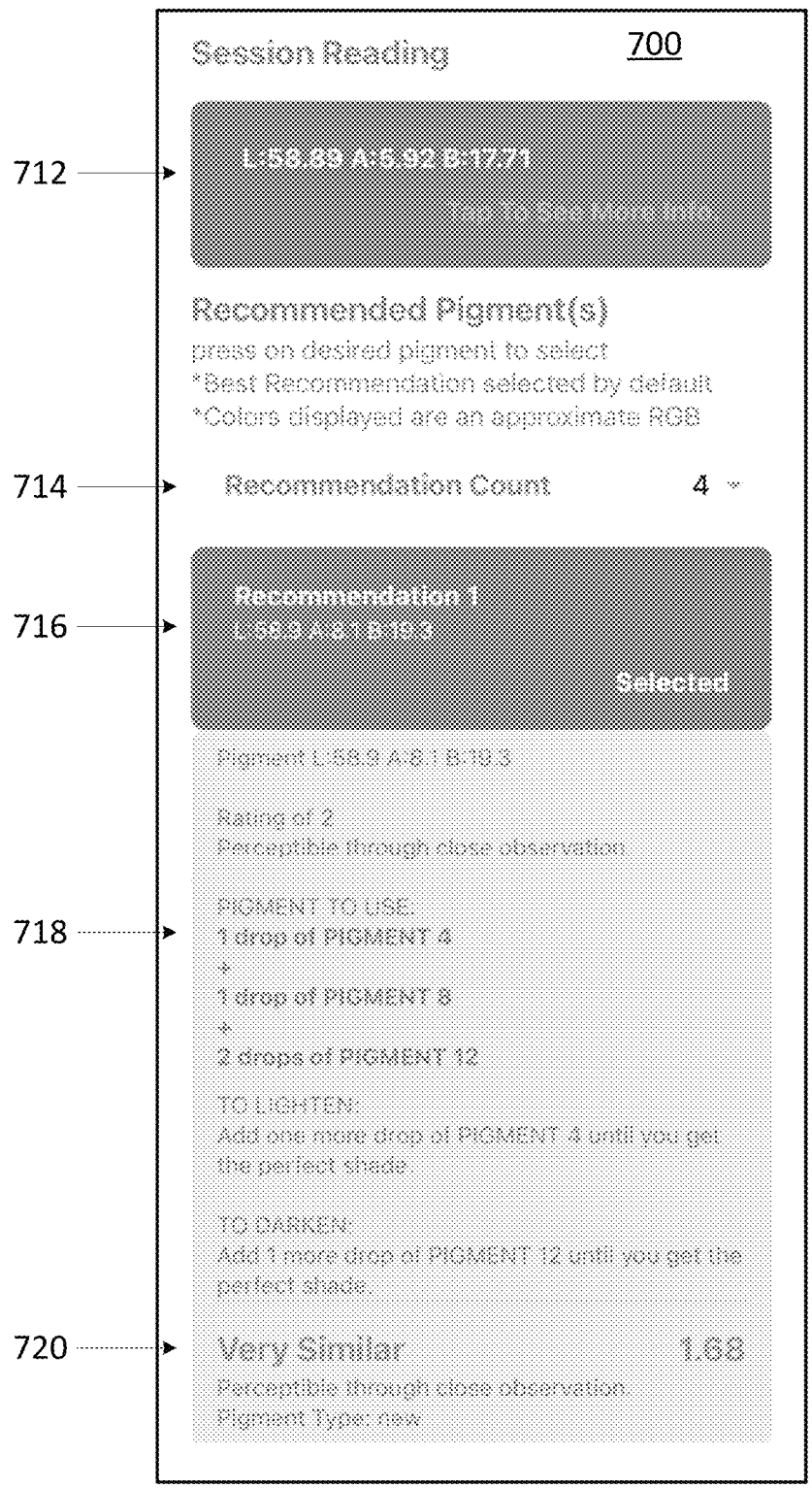
Figure 7C:
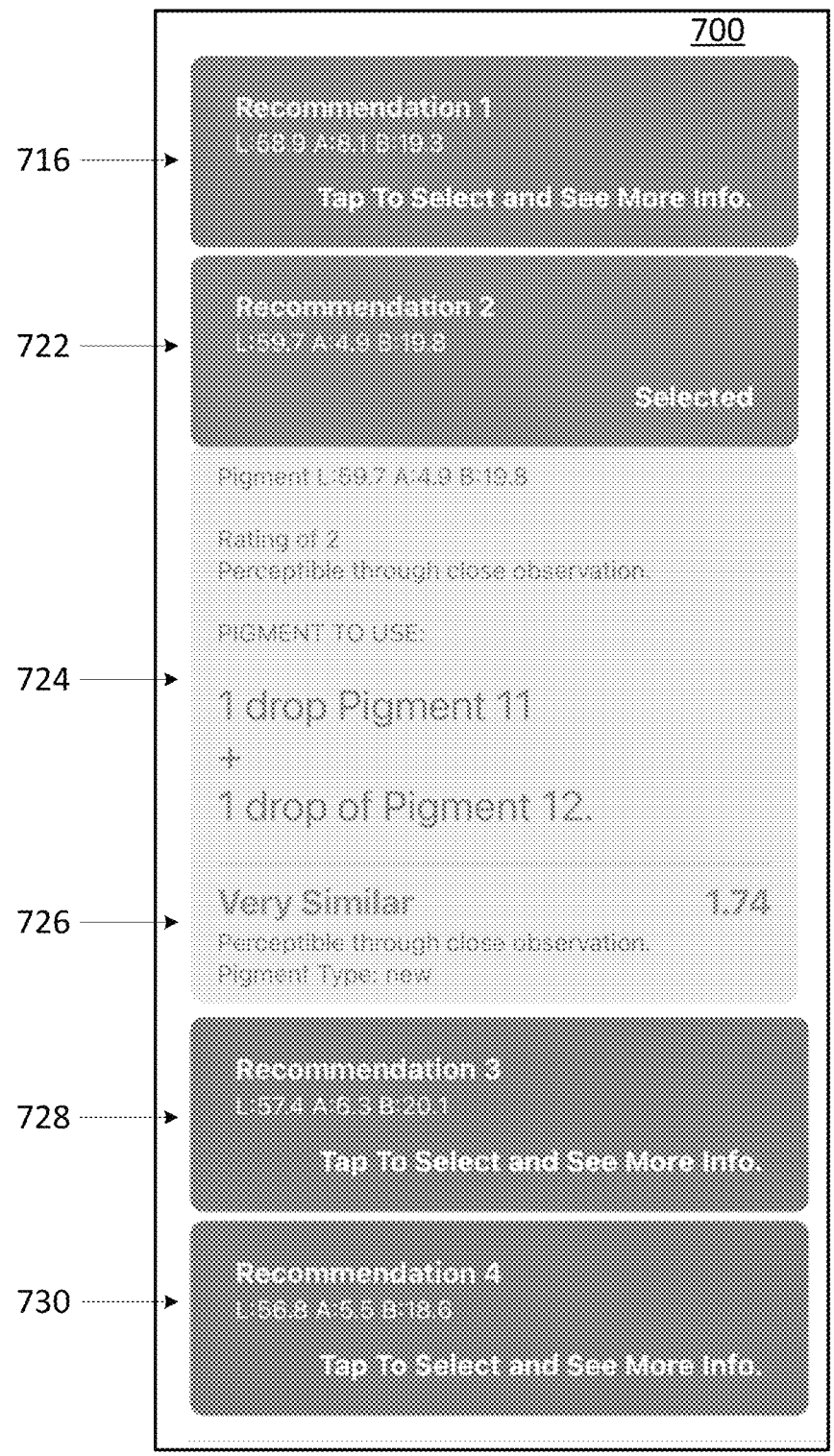

FIGS. 7A-7C are diagrams of a graphical user interface 700 illustrating functionality performed according to some embodiments. The client device 150 is configured to display the user interface 700 with various sections. The client device 150 provides for the creation or addition of a session whereby color readings of a person's skin may be managed. The user interface 700 include a client section 704 where a client identifier is input to the user interface 700 and a pigment type being applied is recorded. The user interface 700 includes a session details section 706 where a date and time of the session is captured, and further information about the session may be input, such as needle depth, hand movements and remarks. The user interface 700 includes a pigment used details 708 where prior Pigment bottle numbers may be record. The user interface 700 includes a section where a user may obtain a before and after image of a client prior to and subsequent to cosmetic tattooing with recommended mixed color pigments. The user interface 700 includes a color readings section 712 to display a color reading obtained from the color reading device 160; a recommendation count section 714 that lists the number of color pigment mixing recommendations; multiple color mixing recommendation section 716, 722, 728 and 730 to display multiple matched recommendations to the color reading obtained from the color reading device 160, a pigment section 508 to display the matched recommendation (e.g., L:56.8, A:5.5, B:18.6); a color pigment mixing section 718, 724 to describe one or more color pigments and optionally a diluent; and a similarity score section 720,726 describing a similar score for the matched recommendation as to the color reading.

Figure 8:
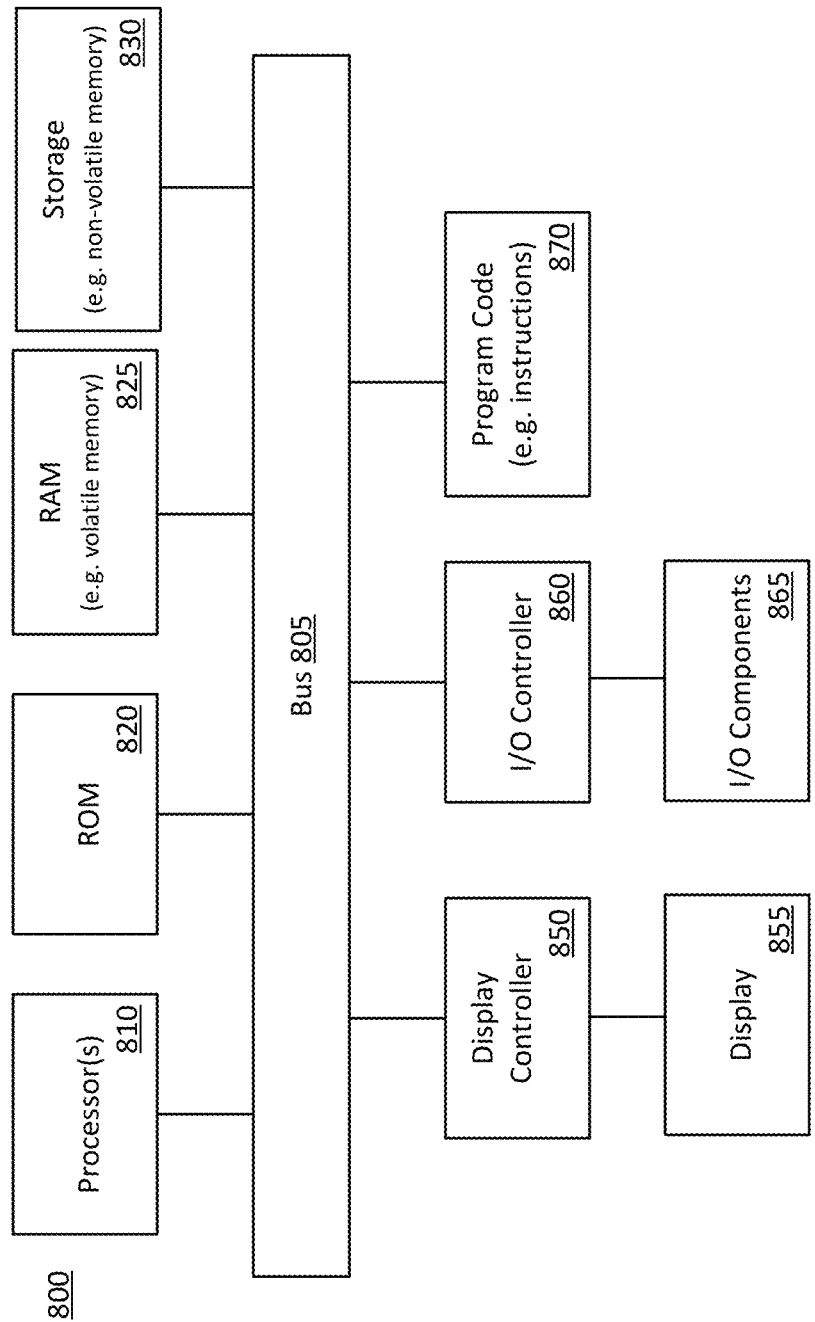
FIG. 8 is a block diagram illustrating an example of a computing system that may be used in conjunction with one or more embodiments of the disclosure.

FIG. 8 shows a block diagram of an example of a computing system that may be used in conjunction with one or more embodiments of the disclosure. For example, computing system 100 (or system, or server, or computing device, or device) may represent any of the devices or systems (e.g., client device 150, color reading device 160, etc.) described herein that perform any of the processes, operations, or methods of the disclosure. Note that while the computing system 100 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor(s) 810 may retrieve stored instructions from one or more of the memories 820, 825, and 830 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 810 may perform operations in an on-demand or "cloud computing" environment or as a service (e.g., within a "software as a service" (SaaS) implementation). Accordingly, the performance of operations may be distributed among the one or more processors 810, whether residing only within a single machine or deployed across a number of machines. For example, the one or more processors 810 may be located in a single geographic location (e.g., within a home environment, an office environment, or a server farm), or may be distributed across a number of geographic locations. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g., accessible via a network).

A display controller 850 may be coupled to the bus 805 in order to receive display data to be displayed on a display device 855, which can display any one of the user interface features or embodiments described herein and may be a local or a remote display device. The computing system 800 may also include one or more input/output (I/O) components 865 including mice, keyboards, touch screen, network interfaces, printers, speakers, and other devices. Typically, the input/output components 865 are coupled to the system through an input/output controller 860.

Program code 670 may represent any of the instructions, applications, software, libraries, toolkits, modules, components, engines, units, functions, logic, etc. as described herein (e.g., system 100, user interface module 252, machine learning training module 254, color value acquisition module 256, color pigment mixing recommendation module 258, machine learning network module 260 and user management module 262, etc.). Program code 670 may reside, completely or at least partially, within the memories described herein (e.g., non-transitory computer-readable media), or within a processor during execution thereof by the computing system. Program code 870 may include both machine code, such as produced by a compiler, and files containing higher-level or intermediate code that may be executed by a computing system or other data processing apparatus (or machine) using an interpreter. In addition, program code 870 can be implemented as software, firmware, or functional circuitry within the computing system, or as combinations thereof. Program code 870 may also be downloaded, in whole or in part, through the use of a software development kit or toolkit that enables the creation and implementation of the described embodiments.

It will be appreciated that the present disclosure may include any one and up to all of the following examples.

Example 1. A system comprising one or more processors configured to perform the operations of: determining one or more color value sets of a person's skin; evaluating the one or more color value sets; and generating one or more color pigment mixing recommendations, the color pigment mixing recommendation including one or more color pigments and an amount of the color pigments to be mixed; and displaying, via a user interface of a client device, the generated one or more color pigment mixing recommendation.

Example 2. The system of Example 1, wherein the determining the one or more color value sets comprises: obtaining by a color sensor device, the one or more color value sets, wherein an individual color value set includes an L* value, an a* value, and a b*value in the L*a*b*color space; and receiving from the color sensor device the one or more color value sets.

Example 3. The system of any one of Examples 1-2, further comprises the operations of: obtaining one or more images, via the client device, of the person's skin; inputting the one or more images into a trained machine learning network configured to determine a color pigment mixing recommendation; and determining by the trained machine learning network the color pigment mixing recommendation.

Example 4. The system of any one of Examples 1-3, further comprises the operations of: inputting the one or more color value sets into a trained machine learning network configured to determine color pigment mixing recommendation; and determining by the trained machine learning network the color pigment mixing recommendation.

Example 5. The system of any one of Examples 1-4, further comprising the operations of: performing a lookup operation to identify a closet match of color values in a lookup table to individual values in the color value set; and selecting a predetermined color pigment mixing recommendation from the lookup table to be the generated color pigment mixing recommendation.

Example 6. The system of any one of Examples 1-5, further comprising the operations of: obtaining multiple color value sets for a person's skin, wherein the set includes a first value, second value and third value; and averaging each of the first values, the second values and the third values and generating an averaged color value set, wherein the generated color pigment mixing recommendation is based on the averaged color value set.

Example 7. The system of any one of Examples 1-6, further comprising the operations: obtaining one or more images, via the client device, of a person's skin; and determining the one or more color value sets of a person's skin based on processing of the one or more images to determine the one or more color value sets.

Example 8. A computer-implemented method comprising: determining one or more color value sets of a person's skin; evaluating the one or more color value sets; and generating one or more color pigment mixing recommendations, the color pigment mixing recommendation including one or more color pigments and an amount of the color pigments to be mixed; and displaying, via a user interface of a client device, the generated one or more color pigment mixing recommendation.

Example 9. The computer-implemented method of Example 8, wherein the determining the one or more color value sets comprises: obtaining by a color sensor device, the one or more color value sets, wherein an individual color value set includes an L*value, an a*value, and a b*value in the L*a*b*color space; and receiving from the color sensor device the one or more color value sets.

Example 10. The computer-implemented method of any one of Examples 8-9, further comprising the operations of: obtaining one or more images, via the client device, of the person's skin; inputting the one or more images into a trained machine learning network configured to determine a color pigment mixing recommendation; and determining by the trained machine learning network the color pigment mixing recommendation.

Example 11. The computer-implemented method of any one of Examples 8-10, further comprising the operations of: inputting the one or more color value sets into a trained machine learning network configured to determine color pigment mixing recommendation; and determining by the trained machine learning network the color pigment mixing recommendation.

Example 12. The computer-implemented method of any one of Examples 8-11, further comprising the operations of:

performing a lookup operation to identify a closet match of color values in a lookup table to individual values in the color value set; and selecting a predetermined color pigment mixing recommendation from the lookup table to be the generated color pigment mixing recommendation.

Example 13. The computer-implemented method of any one of Examples 8-12, further comprising the operations of: obtaining multiple color value sets for a person's skin, wherein the set includes a first value, second value and third value; and averaging each of the first values, the second values and the third values and generating an averaged color value set, wherein the generated color pigment mixing recommendation is based on the averaged color value set.

Example 14. The computer-implemented method of any one of Examples 8-13, further comprising the operations: obtaining one or more images, via the client device, of a person's skin; and determining the one or more color value sets of a person's skin based on processing of the one or more images to determine the one or more color value sets.

Example 15. A non-transitory computer readable medium that stores executable program instructions that when executed by one or more computing devices configure the one or more computing devices to perform operations comprising: determining one or more color value sets of a person's skin; evaluating the one or more color value sets; and generating one or more color pigment mixing recommendations, the color pigment mixing recommendation including one or more color pigments and an amount of the color pigments to be mixed; and displaying, via a user interface of a client device, the generated one or more color pigment mixing recommendation.

Example 16. The non-transitory computer readable medium of Example 15, wherein the determining the one or more color value sets comprises: obtaining by a color sensor device, the one or more color value sets, wherein an individual color value set includes an L*value, an a*value, and a b*value in the L*a*b*color space; and receiving from the color sensor device the one or more color value sets.

Example 17. The non-transitory computer readable medium of Examples 15-16, further comprising the operations of: obtaining one or more images, via the client device, of the person's skin; inputting the one or more images into a trained machine learning network configured to determine a color pigment mixing recommendation; and determining by the trained machine learning network the color pigment mixing recommendation.

Example 18. The non-transitory computer readable medium of Examples 15-17, further comprising the operations of: inputting the one or more color value sets into a trained machine learning network configured to determine color pigment mixing recommendation; and determining by the trained machine learning network the color pigment mixing recommendation.

Example 19. The non-transitory computer readable medium of Examples 15-18, further comprising the operations of: performing a lookup operation to identify a closet match of color values in a lookup table to individual values in the color value set; and selecting a predetermined color pigment mixing recommendation from the lookup table to be the generated color pigment mixing recommendation.

Example 20. The non-transitory computer readable medium of Examples 15-19, further comprising the operations of: obtaining multiple color value sets for a person's skin, wherein the set includes a first value, second value and third value; and averaging each of the first values, the second values and the third values and generating an averaged color value set, wherein the generated color pigment mixing recommendation is based on the averaged color value set.

Example 21. The non-transitory computer readable medium of Examples 15-20, further comprising the operations: obtaining one or more images, via the client device, of a person's skin; and determining the one or more color value sets of a person's skin based on processing of the one or more images to determine the one or more color value sets.

Moreover, any of the disclosed embodiments may be embodied in various types of hardware, software, firmware, and combinations thereof. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:
1. A system comprising:
a color reading device, the color reading device configured to obtain color value readings;

a processing engine operable on a client device having one or more processors configured to perform the operations of:

receiving, by the client device from the color reading device, color value readings of a person's skin, wherein the color reading device is paired to the client device;

based on the received color value readings, determining one or more color value sets of the person's skin;

generating one or more color pigment mixing recommendations for cosmetic tattooing over a portion of the person's skin, the color pigment mixing recommendations including one or more associated identifiers related to color pigments and an amount of the color pigments to be mixed; and displaying, via a user interface of the client device, the color pigment mixing recommendations, wherein the user interface depicts a first display section depicting the color readings received from the color reading device, and wherein the user interface depicts a second display section including a listing of a plurality of pigments to be combined to recreate a color pigmentation associated with the color readings using one or more color pigments from a set of color pigments.

2. The system of claim 1, wherein the determining the one or more color value sets comprises:

obtaining by the color reading device, the one or more color value sets, wherein an individual color value set includes an L* value, an a* value, and a b* value in the L*a*b* color space; and receiving from the color sensor device the one or more color value sets.

3. The system of claim 1, further comprises the operations of:

obtaining one or more images, via the client device, of the person's skin;

inputting the one or more images into a trained machine learning network configured to determine a color pigment mixing recommendation, wherein the machine learning network is trained on an image data set of images of multiple person's skin color; and determining by the trained machine learning network the one or more color pigment mixing recommendations comprising the associated identifiers, wherein an associated identifier corresponds to a pigment number for a bottle of a set of bottles.

4. The system of claim 1, further comprises the operations of:

inputting the one or more color value sets into a trained machine learning network configured to determine one or more color pigment mixing recommendations, wherein the machine learning network is trained on an image data set of images of multiple person's skin color; and determining by the trained machine learning network the one or more color pigment mixing recommendations comprising the associated identifiers, wherein an associated identifier corresponds to a pigment number for a bottle of a set of bottles.

5. The system of claim 4, further comprising the operations of:

performing a lookup operation to identify a closet match of color values in a lookup table to individual values in the color value set;

identifying one or more closest or approximate matches in the lookup table to the color value set; and selecting one or more predetermined color pigment mixing recommendations from the lookup table to be the generated one or more color pigment mixing recommendations.

6. The system of claim 1, further comprising the operations of:

obtaining multiple color value sets for the person's skin, wherein the set includes a first value, second value and third value; and averaging each of the first values, the second values and the third values and generating an averaged color value set, wherein the generated color pigment mixing recommendation is based on the averaged color value set.

7. The system of claim 1, further comprising the operations:

displaying, via the user interface multiple different recommendations for mixing color pigments, wherein the multiple recommendations each have a different color reading values for the person's skin; and displaying, via the user interface, an input section that includes an input for recording details of pigments used, and wherein the user interface includes a control for obtaining a photo before and a photo after pigments have been applied to the person's skin; and obtaining one or more images, via the client device, of the person's skin.

8. A computer-implemented method comprising:

a processing engine operable on a client device having one or more processors configured to perform the operations of:

receiving, by the client device from a color reading device, color value readings of a person's skin;

based on the received color value readings, determining one or more color value sets of the person's skin;

generating one or more color pigment mixing recommendations for cosmetic tattooing over a portion of the person's skin, the color pigment mixing recommendations including one or more associated identifiers related to a color pigments and an amount of the color pigments to be mixed; and displaying, via a user interface of the client device, the color pigment mixing recommendations, wherein the user interface depicts a first display section depicting the color readings received from the color reading device, and wherein the user interface depicts a second display section including a listing of a plurality of pigments to be combined to recreate a color pigmentation associated with the color readings using one or more color pigments from the set of color pigments.

9. The computer-implemented method of claim 8, wherein the determining the one or more color value sets comprises:

obtaining by the color sensor device, the one or more color value sets, wherein an individual color value set includes an L* value, an a* value, and a b* value in the L*a*b* color space; and receiving from the color sensor device the one or more color value sets.

10. The computer-implemented method of claim 8, further comprising the operations of:

obtaining one or more images, via the client device, of the person's skin;

inputting the one or more images into a trained machine learning network configured to determine a color pigment mixing recommendation; and determining by the trained machine learning network the color pigment mixing recommendation.

11. The computer-implemented method of claim 8, further comprising the operations of:
- inputting the one or more color value sets into a trained machine learning network configured to determine color pigment mixing recommendation; and
- determining by the trained machine learning network the color pigment mixing recommendation.

12. The computer-implemented method of claim 11, further comprising the operations of:
- performing a lookup operation to identify a closet match of color values in a lookup table to individual values in the color value set;
- identifying one or more closest or approximate matches in the lookup table to the color value set; and
- selecting a predetermined color pigment mixing recommendation from the lookup table to be the generated color pigment mixing recommendation.

13. The computer-implemented method of claim 8, further comprising the operations of:
- obtaining multiple color value sets for a person's skin, wherein the set includes a first value, second value and third value; and
- averaging each of the first values, the second values and the third values and generating an averaged color value set, wherein the generated color pigment mixing recommendation is based on the averaged color value set.

14. The computer-implemented method of claim 8, further comprising the operations:
- displaying, via the user interface multiple different recommendations for mixing color pigments, wherein the multiple recommendations each have a different color reading values for the person's skin; and
- displaying, via the user interface, an input section that includes an input for recording details of pigments used, and wherein the user interface includes a control for obtaining a photo before and a photo after pigments have been applied to the person's skin; and
- obtaining one or more images, via the client device, of the person's skin.

15. A non-transitory computer readable medium that stores executable program instructions that when executed by one or more computing devices configure the one or more computing devices to perform operations comprising:
- a processing engine operable on a client device having one or more processors configured to perform the operations of:
- receiving from a color reading device, color value readings of a person's skin;
- based on the received color value readings, determining one or more color value sets of the person's skin;
- generating one or more color pigment mixing recommendations for cosmetic tattooing over a portion of the person's skin, the color pigment mixing recommendations including one or more associated identifiers related to a set of color pigments and an amount of the color pigments to be mixed; and
- displaying, via a user interface of the client device, the color pigment mixing recommendations, wherein the user interface depicts a first display section depicting the color readings received from the color reading device, and wherein the user interface depicts a second display section including a listing of a plurality of pigments to be combined to recreate a color pigmentation associated with the color readings using one or more color pigments from the set of color pigments.

16. The non-transitory computer readable medium of claim 15, wherein the determining the one or more color value sets comprises:
- obtaining by the color sensor device, the one or more color value sets, wherein an individual color value set includes an L* value, an a* value, and a b* value in the L*a*b* color space; and
- receiving from the color sensor device the one or more color value sets.

17. The non-transitory computer readable medium of claim 15, further comprising the operations of:
- obtaining one or more images, via the client device, of the person's skin;
- inputting the one or more images into a trained machine learning network configured to determine a color pigment mixing recommendation; and
- determining by the trained machine learning network the color pigment mixing recommendation.

18. The non-transitory computer readable medium of claim 15, further comprising the operations of:
- inputting the one or more color value sets into a trained machine learning network configured to determine color pigment mixing recommendation; and
- determining by the trained machine learning network the color pigment mixing recommendation.

19. The non-transitory computer readable medium of claim 18, further comprising the operations of:
- performing a lookup operation to identify a closet match of color values in a lookup table to individual values in the color value set;
- identifying one or more closest or approximate matches in the lookup table to the color value set; and
- selecting a predetermined color pigment mixing recommendation from the lookup table to be the generated color pigment mixing recommendation.

20. The non-transitory computer readable medium of claim 15, further comprising the operations of:
- obtaining multiple color value sets for the person's skin, wherein the set includes a first value, second value and third value; and
- averaging each of the first values, the second values and the third values and generating an averaged color value set, wherein the generated color pigment mixing recommendation is based on the averaged color value set.

21. The non-transitory computer readable medium of claim 15, further comprising the operations:
- displaying, via the user interface multiple different recommendations for mixing color pigments, wherein the multiple recommendations each have a different color reading values for the person's skin; and
- displaying, via the user interface, an input section that includes an input for recording details of pigments used, and wherein the user interface includes a control for obtaining a photo before and a photo after pigments have been applied to the person's skin; and
- obtaining one or more images, via the client device, of the person's skin.

* * * * *